March 17, 1964 D. C. LARKIN Re. 25,537

SEAT COVER

Original Filed May 12, 1953

INVENTOR.
DANIEL C. LARKIN
BY
Burton & Parker
ATTORNEYS

United States Patent Office

Re. 25,537
Reissued Mar. 17, 1964

25,537
SEAT COVER

Daniel Charles Larkin, 3134 Woodstock Drive, Detroit 21, Mich.

Original No. 2,744,567, dated May 8, 1956, Ser. No. 354,555, May 12, 1953. Application for reissue Nov. 5, 1963, Ser. No. 321,707
7 Claims. (Cl. 297—219)

Matter enclosed in heavy brackets [ ] appears in the original patent but forms no part of this reissue specification; matter printed in italics indicates the additions made by reissue.

This invention relates to an improved seat cover and particularly to a cover for an automobile seat.

One object is to provide a cover for an automobile seat which cover is so constructed as to present an upper wearing surface which surface possesses a smooth, hard, slippery finish to permit an occupant of the seat to slide easily thereover from one end to the other without disarrangement or sticking of the clothes to the cover, and which cover is also so constructed as to present an under wearing surface adapted to directly overlie the assembly seat cushion, which, under surface strongly resists slidable movement thereof over the seat cushion and tends to grip the same and adhere thereto. This seat cover as a result of such two-ply construction may be secured to a seat cushion with a minimum of attaching means.

More specifically, an object is to provide a seat cover of the character described which consists of a multi-ply sheet, the upper ply of which may be formed of rayon, nylon, or other suitable hard finish wear resistant smooth, sleek material, and the rear ply of which may be formed of sponge rubber, felt, or the like.

The upper ply presents a slippery surface over which an occupant of the seat may easily slide. The lower ply presents such a surface to the seat cushion that sliding of the cover thereover is strongly resisted and the cover tends to so frictionally engage and grip the top surface of the seat cushion that sliding movement of the seat occupant over the cover will not disturb the relationship of the cover upon the seat cushion.

Due to the prounced affinity of the cover for the cushion and its secure adherence thereto and its resistance to slidable movement thereover, it is possible to fasten a cover upon a seat cushion with a minimum of attaching means and the cover will at all times present a smooth, unwrinkled, neat appearance.

Other objects, advantages and meritorious features will more fully appear from the following specification, claims and accompanying drawing, wherein:

FIG. 1 in the upper view is a perspective of the seat cover embodying my invention, and in the lower view is a perspective of a seat cushion before placement of the cover thereon;

The seat cover of my invention is illustrated as mounted upon an automobile seat cushion. It is for this purpose that it is particularly designed. It is obvious, however, that it might be used as a cover for seat cushions of various kinds, or even for the back cushions of seats or the like.

Figure 1:
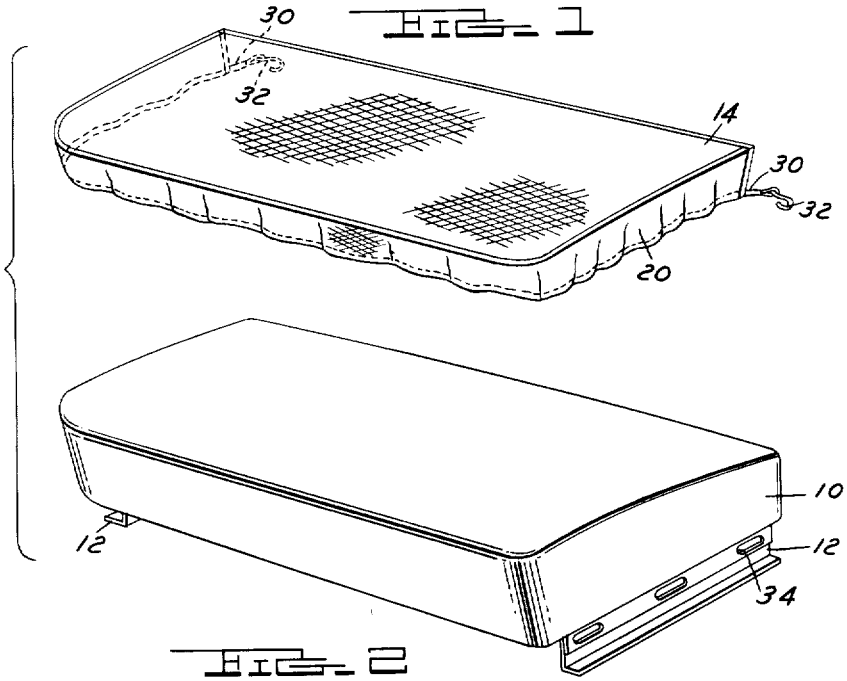

In the drawings, a seat cushion is indicated in the lower view of FIG. 1 by the numeral 10. The supporting rails which mount the cushion assembly upon the floor of the vehicle are indicated by the numeral 12. This seat cushion assembly as shown and as customarily provided constitutes a supporting spring structure which may be of the coil spring type or the zig-zag spring type, both of which are in common and widespread use.

It is customary to spread a spring liner over the springs and suitable cushioning material and then to provide a top layer of trim material which completely encloses this inner assembly and in the lower view of FIG. 1, the cushion so exhibits such trim material which may be of any suitable trim fabric. Such trim fabric commonly presents a rough surface or nape which impedes the slidable movement of an occupant of the seat thereover. This of course is not true of a leather cushion, but leather is not in widespread use at the present time.

Seat covers of various kinds have heretofore been provided. Such covers are formed to fit neatly over the seat cushion and to be secured to the seat frame to maintain the same in place. Such covers are commonly formed of wear resisting protective material which may be of smooth material over which an occupant can slide and which will protect the upholstery fabric. Difficulty is experienced, however, in securing such covers to the seat cushion so that they will retain their place thereon without sliding to one side or becoming disarranged as they are used and it is customary to secure them to the seat cushion fully thereabout.

The seat cover here shown is formed of a multi-ply sheet. There is an uppermost wear resisting ply indicated by the numeral 14 which may be formed of rayon,, nylon, or the like. It is formed of a smooth, hard finish, somewhat slippery material. Such upper ply is secured to a lower ply indicated by the numeral 16. The lower ply may be formed of felt, sponge rubber, or the like. Sponge rubber is preferred because it presents an ideal surface for the purpose desired. As shown in FIGS. 3 and 4, the sponge rubber layer 16 possesses a thickness substantially in excess of that of the upper layer of rayon 14. The rayon layer 14 is folded over the front edge of the sponge rubber layer 16 and may be folded back there underneath as at 18, and may then extend downwardly forming a skirt 20. Such rayon layer may be similarly folded back underneath the ends and then extended down to form an end skirt which is a continuation of the front skirt 20, all as shown in FIG. 2.

A reinforcing strip 22 may overlie the upper surface of the rayon layer 14 along the front edge and along the ends and be stitched therethrough and through the sponge rubber layer as at 24, all as shown in FIG. 4. A binding 26 may be folded about the rear edge of the cover as shown in FIG. 3.

Figure 2:
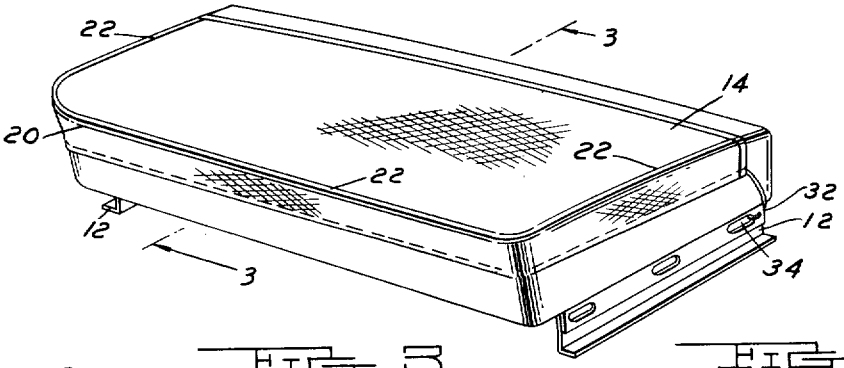
FIG. 2 is a perspective of a seat cushion provided with my improved cover secured thereover.
Figure 3:
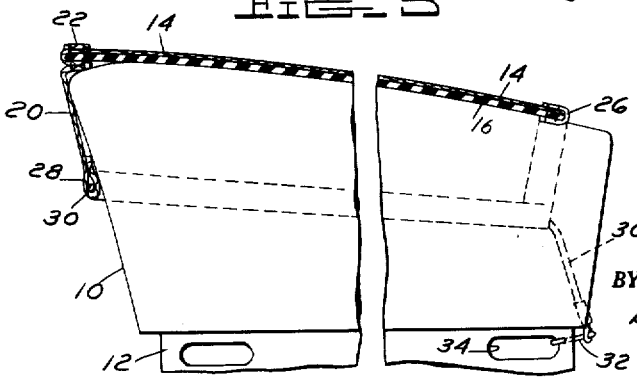
FIG. 3 is a vertical sectional view taken on the line 3—3 of FIG. 2.
Figure 4:
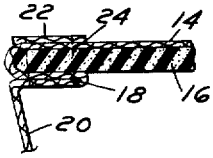
FIG. 4 is a fragmentary enlarged sectional view through the seat cover along its forward edge.

The lower edge of the skirt is folded over upon itself providing a tubular pleat 28 and a tie-cord 30 or the like extends through this tubular pleat, as shown in FIGS. 2 and 3. The ends of this cord may terminate in hooks 32 which hooks are adapted to be engaged within apertures 34 formed in the seat supports 12, all as shown in FIGS. 2 and 3. This cord may be a flexible, resilient rubber reinforced cord as is available on the market so that a constant tension may be maintained about the bottom of the skirt holding the seat cover upon the seat cushion and stretching the same snugly thereover.

Seat covers are presently made so that the front face slopes somewhat rearwardly and downwardly. The seat cushion assembly is designed in this fashion so as to properly support the knees of an occupant of the seat, and it will be noted that the skirt terminates so that the securing cord 30 extends about the seat at a point substantially below its upper margin and the cover is held securely against displacement thereon. The cord extends about the seat cushion assembly along a median line between upper and bottom portions of the assembly and is drawn thereabout so that the cover is held down securely.

What I claim is:

1. A cover for an automobile seat cushion comprising substantially coterminous upper and lower plies of flexible sheet material juxtaposed and secured together forming a multi-ply flexible sheet adapted to overlie the top surface of an automobile seat cushion and being substantially coextensive therewith, the upper ply presenting a smooth hard finished sleek outer surface over which an occupant of a seat provided with the cover may easily slide, the lower ply being one of sponge rubber, and anchoring means secured to the cover to fasten the same to a seat frame.

2. A cover for an automobile seat cushion comprising upper and lower plies of flexible sheet material juxtaposed and secured together forming a multi-ply flexible sheet, the upper ply presenting a smooth, hard finished sleek outer surface over which an occupant of a seat provided with the cover may easily slide, the lower ply being one of sponge rubber substantially coterminous with the seat portion of the upper ply and secured thereto throughout its expanse, a skirt depending from the front margin and the two end margins of the seat portion of the upper ply and formed by a continuation of the upper ply only, a securing cord extending along the lower margin of the skirt and coupled therewith and provided at opposite ends with anchoring means adapted to engage suitable anchoring devices to hold the cover in place upon the seat cushion, said skirt having a width less than the height of the seat to which it is applied.

3. A cover for an automobile seat cushion comprising upper and lower plies of flexible sheet material juxtaposed and secured together forming a multi-ply flexible sheet, the upper ply presenting a smooth, hard finished sleek outer surface over which an occupant of a seat provided with the cover may easily slide, the lower ply being one of sponge rubber having an outer surface exhibiting a pronounced resistance to slidable movement thereover and adapted to frictionally engage with substantial adhesion thereto a seat cushion over which the cover is spread, said lower ply extending throughout a seating area of the upper ply and secured thereto throughout such area with the upper ply having a skirt extending along the front and sides of the seating area and beyond the lower ply, a portion of said skirt being folded about the adjacent marginal edges of the lower ply and extending over the underside of the lower ply adjacent the margin thereof and secured thereto, the remaining portion of the skirt depending from the seating area and the lower ply, and securing means extending along the margin of the skirt and adapted to be secured to suitable anchoring devices to hold the cover in place on the seat cushion.

4. In a seat cover for automobiles and the like a top pad, a sponge rubber layer secured to the lower surface of said top pad and coextensive therewith, a skirt depending from the front and side edges of said top pad, said skirt having a width less than the height of the seat to which it is applied, an elastic cord secured to the lower edge of said skirt throughout its entire length and extending beyond the lower rear corners of said skirt, and hook members secured to the ends of said elastic cord.

5. A seat cover as defined in claim 1, characterized in that a skirt is secured to the upper ply and depends therefrom along the front margin and along the two end margins which skirt has a width less than the height of the seat to which the cover is applied, and characterized further in that the anchoring means is secured to the lower margin of the skirt and is adapted to tension the same to draw the seat portion of the cover taut across the top surface of a seat cushion.

*6. A cover for the seat cushion of an automobile seat comprising substantially coterminus upper and lower plies of flexible sheet material juxtaposed and secured together forming a multi-ply flexible sheet adapated to overlie the top surface of an automobile seat cushion and being substantially coextensive therewith, the upper ply presenting a smooth hard finished sleek outer surface over which an occupant of a seat provided with the cover may easily slide, the lower ply being one of sponge rubber and secured to the upper ply throughout its expanse, a skirt depending only from the front margin and the two end margins of the seat portion readily slidable relative to the front and sides of a seat cushion over which the skirt lies, and means extending along the lower margin of the skirt for tensioning the skirt downwardly about the seat cushion along the front and sides of the seat cushion including a resilient cord and anchoring means for engaging portions of the seat to secure the cover thereto in tension.*

*7. The invention as defined in claim 6 characterized in that the skirt has a smooth hard finished sleek surface readily slidable relative to the front and sides of a seat cushion.*

References Cited in the file of this patent or the original patent

UNITED STATES PATENTS

| | | |
|---|---|---|
| 770,973 | Lippert | Sept. 27, 1904 |
| 1,499,166 | Frazier | June 24, 1924 |
| 1,610,286 | Hood et al. | Dec. 14, 1926 |
| 1,717,121 | Sallop | June 11, 1929 |
| 1,804,841 | Pedroli | May 12, 1931 |
| 1,860,520 | Zink | May 31, 1932 |
| 1,878,045 | Wedler | Sept. 30, 1932 |
| 2,202,065 | Peebles | May 28, 1940 |
| 2,516,363 | Block et al. | June 25, 1950 |
| 2,546,109 | Puchalsky | Mar. 20, 1951 |